US 6,736,275 B2

(12) United States Patent
Schneider et al.

(10) Patent No.: US 6,736,275 B2
(45) Date of Patent: May 18, 2004

(54) FLOCCULATING ENERGY DISSIPATING WELL ARRANGEMENT (FEDWA)

(75) Inventors: Jeffrey J. Schneider, Mukwonago, WI (US); Robert J. Fedie, Mukwonago, WI (US)

(73) Assignee: United States Filter Corporation, Palm Desert, CA (US)

( * ) Notice: Subject to any disclaimer, the term of this patent is extended or adjusted under 35 U.S.C. 154(b) by 111 days.

(21) Appl. No.: 10/054,378

(22) Filed: Jan. 22, 2002

(65) Prior Publication Data

US 2003/0136730 A1 Jul. 24, 2003

(51) Int. Cl.⁷ .............................................. B01D 21/24
(52) U.S. Cl. ........................ 210/519; 210/528; 210/541
(58) Field of Search ................................ 210/519, 520, 210/528, 532.1, 538, 540, 541

(56) References Cited

U.S. PATENT DOCUMENTS

| | | | |
|---|---|---|---|
| 2,073,810 A | 3/1937 | Sayers et al. | |
| 2,098,463 A | 11/1937 | Morehead | |
| 2,140,059 A | * 12/1938 | Sinonsen | 210/528 |
| 2,205,199 A | 6/1940 | Hubbell et al. | |
| 2,355,875 A | 8/1944 | Lasseter | |
| 2,428,756 A | 10/1947 | Lind | |
| 2,659,488 A | 11/1953 | Williams | |
| 2,669,357 A | 2/1954 | Kivell et al. | |
| 2,713,027 A | * 7/1955 | Binford | 210/528 |
| 2,894,637 A | 7/1959 | Schreiber | |
| 2,922,524 A | * 1/1960 | Rankin | 210/528 |
| 3,036,715 A | 5/1962 | Gould | |
| 3,140,259 A | * 7/1964 | Kelly | 210/519 |
| 3,175,692 A | 3/1965 | Vrablik | |
| 3,282,425 A | 11/1966 | Christiani | |
| 3,473,661 A | 10/1969 | Duff | |
| 3,486,628 A | 12/1969 | Darby | |
| 3,539,051 A | * 11/1970 | Stone | 210/528 |
| 3,722,698 A | 3/1973 | Hampton | |
| 3,770,131 A | 11/1973 | Davis et al. | |
| 3,926,805 A | 12/1975 | Walker | |
| 3,951,806 A | 4/1976 | Young | |
| 4,054,514 A | 10/1977 | Oltmann | |
| 4,055,494 A | 10/1977 | Emmett, Jr. | |
| 4,270,676 A | 6/1981 | Green | |
| 4,376,045 A | 3/1983 | Siskind | |
| 4,392,955 A | 7/1983 | Soriente | |
| 5,200,079 A | 4/1993 | Schwartz et al. | |
| 5,378,358 A | 1/1995 | Park | |
| 5,714,068 A | * 2/1998 | Brown | 210/541 |
| 5,840,198 A | 11/1998 | Clarke | |
| 5,944,995 A | 8/1999 | Sethi et al. | |
| 6,004,470 A | 12/1999 | Abril | |
| 6,042,722 A | 3/2000 | Lenz | |
| 6,068,134 A | 5/2000 | Shurtleff | |
| 6,099,743 A | 8/2000 | Pedersen | |
| 6,224,773 B1 | 5/2001 | Adams, Jr. | |
| 6,276,537 B1 | * 8/2001 | Esler et al. | 210/541 |
| 6,365,040 B1 | * 4/2002 | Botsch | 210/519 |

OTHER PUBLICATIONS

Figure 2, Design Details for the LA–EDI, published prior to Jan. 22, 2001.

* cited by examiner

*Primary Examiner*—Christopher Upton
(74) *Attorney, Agent, or Firm*—Michael Best & Friedrich LLP (57) ABSTRACT

The clarifier of the present invention includes a tank, an influent pier, and a FEDWA. The tank that includes a bottom and a wall. The influent pier projects upwardly from the bottom of the tank along an axis. The influent pier includes ports that direct flow of the solution outwardly from the influent pier. The FEDWA separates the flow of the solution that is discharged by the ports and that flows into the tank. The separated flow of the solution includes a first flow portion that is directed in a first direction that is generally tangential with respect to the axis of the influent pier, a second flow portion that is directed in a second direction that is opposite to the first direction of the first flow portion, and a third flow portion that is directed in a third direction toward the axis.

21 Claims, 7 Drawing Sheets

FLOCCULATING ENERGY DISSIPATING WELL ARRANGEMENT (FEDWA)

FIELD OF THE INVENTION

The invention relates to clarifiers, and more specifically, to clarifiers having flocculating energy dissipating well arrangements.

BACKGROUND OF THE INVENTION

Clarifiers typically include a tank, a center influent pier, an outer well, and a sludge removal mechanism. The tank includes a bottom and a wall that extends upwardly from the perimeter of the bottom such that the tank is capable of containing a liquid. The influent pier projects from the bottom of the tank along an axis and includes ports that initially direct a solution containing suspended solids outwardly. The clarifier includes a cage that is rotatably supported at the top of the influent pier with a bearing. The cage is a vertical box type truss structure that surrounds the influent pier and supports the sludge removal system and the outer well. The solution flows from the influent pier to the wall of the outer well which dissipates the energy of the influent flow and which promotes flocculation of the solution. During flocculation the solids suspended in the solution collide and form flocculants that settle out from the solution onto the tank floor to clarify the solution. The clarified liquid is removed from the tank through outlet ports located along the tank wall near the surface of the solution, and the sludge removal mechanism retrieves the sludge that settles from the solution onto the bottom of the tank.

Some clarifiers include a flocculating energy dissipating well arrangement ("FEDWA") that is positioned between the center influent pier and the outer well to further dissipate the flow energy of the solution and generate increased flocculation of the solution. The FEDWA is also supported by the cage, and the cage includes a plate that defines a planar horizontal surface that is positioned just below the inlet ports of the influent pier. The FEDWA includes outer baffles that are positioned outside of the cage. The outer baffles each include a vertical portion and a horizontal portion that is coplanar with the cage plate.

By way of this arrangement, the FEDWA dissipates the flow energy of the solution discharged from ports of the influent pier by separating the flow into a bi-directional flow having a first flow portion and a second flow portion. The first flow portion is directed in a first direction that is generally tangential with respect to the axis of the influent pier and the second flow portion is directed in a second direction that is opposite to the first direction of the first flow portion. The flow exits the FEDWA and flows around the outer well which further dissipates the flow energy and prevents the flow from moving directly from the FEDWA to the wall of the tank.

SUMMARY OF THE INVENTION

The flocculating energy dissipating well arrangement (FEDWA) of the present invention provides tri-directional flow by positioning horizontal portions of outer most baffles below the vertical level of the cage plate. The tri-directional flow results in superior diffusion and dissipation of flow energy of the influent flow by directing flow back toward the influent pier causing the solution that is discharged from the ports of the influent pier to flow back and impinge onto itself creating another area of confluence. In addition, the tri-directional flow prevents flocculants from depositing onto the horizontal portions of the baffles. The additional area of confluence below and outside the FEDWA promotes passive flocculation of the suspended solids promoting increased settling rates.

The FEDWA of the present invention also allows the clarifier to be operated without an outer well by alone providing sufficient flow energy dissipation and flocculation of the solution. Specifically, the FEDWA of the present invention provides tri-directional flow that results in increased directional changes in the flow of the solution which increases flocculation and energy dissipation allowing the outer well to be removed from the clarifier. Removal of the outer well decreases the weight being supported by the bearing of the cage and thereby increases the service life of the bearing to provide a cost savings.

The present invention is directed to a clarifier that is used to separate suspended solids from a solution. The clarifier includes a tank, an influent pier, and a FEDWA. The tank includes a bottom and a wall that extends upwardly from the bottom. The influent pier projects upwardly from the bottom of the tank along an axis. The influent pier includes ports that direct flow of the solution outwardly from the influent pier. The FEDWA separates the flow of the solution that is discharged by the ports and that flows into the tank. The separated flow of the solution includes first, second, and third flow portions. The first flow portion is directed in a first direction that is generally tangential with respect to the axis of the influent pier. The second flow portion is directed in a second direction that is opposite to the first direction of the first flow portion. The third flow portion is directed in a third direction toward the axis.

The present invention is also directed to a FEDWA that is used with a clarifier. The FEDWA includes a cage and outer baffles. The cage includes a plate, and the outer baffles are mounted to the cage and positioned outside of the cage. The outer baffles include vertical portions and horizontal portions that extend from the vertical portions. The horizontal portions are positioned below the plate of the cage.

In addition, the present invention is directed to a clarifier that includes a tank, an influent pier, and a FEDWA. The tank includes a bottom and a wall extending upwardly from the bottom. The influent pier projects upwardly from the bottom of the tank along an axis and includes ports that direct flow of the solution outwardly from the influent pier. The FEDWA separates the flow of the solution discharged by the ports and flowing into the tank. The clarifier does not include any well between the FEDWA and the wall of the tank.

Other features and advantages of the invention will become apparent to those skilled in the art upon review of the following detailed description, claims, and drawings.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

Figure 1:
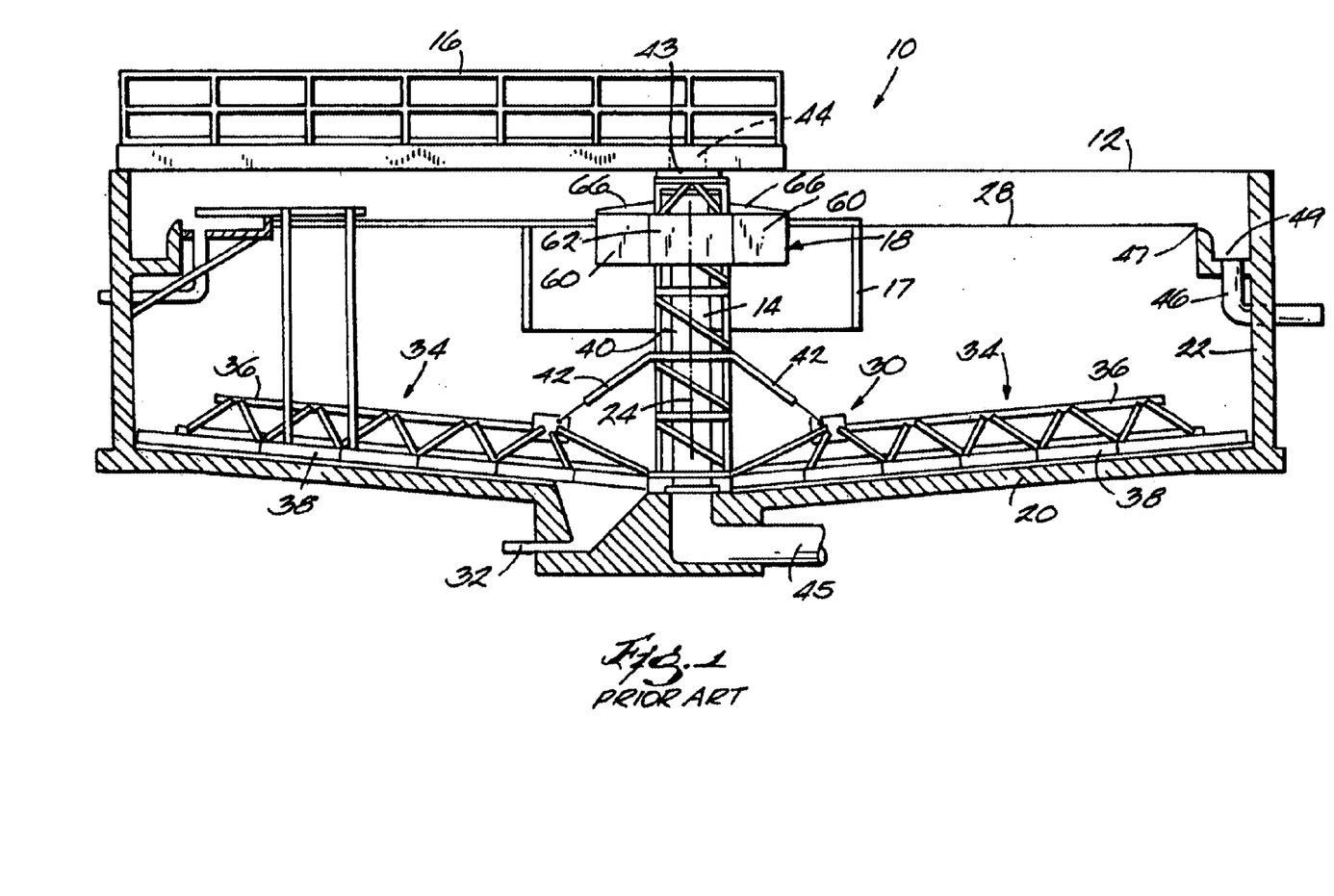
FIG. 1 is a cross section elevation view of a prior art clarifier arrangement including an outer well.
Figure 2:
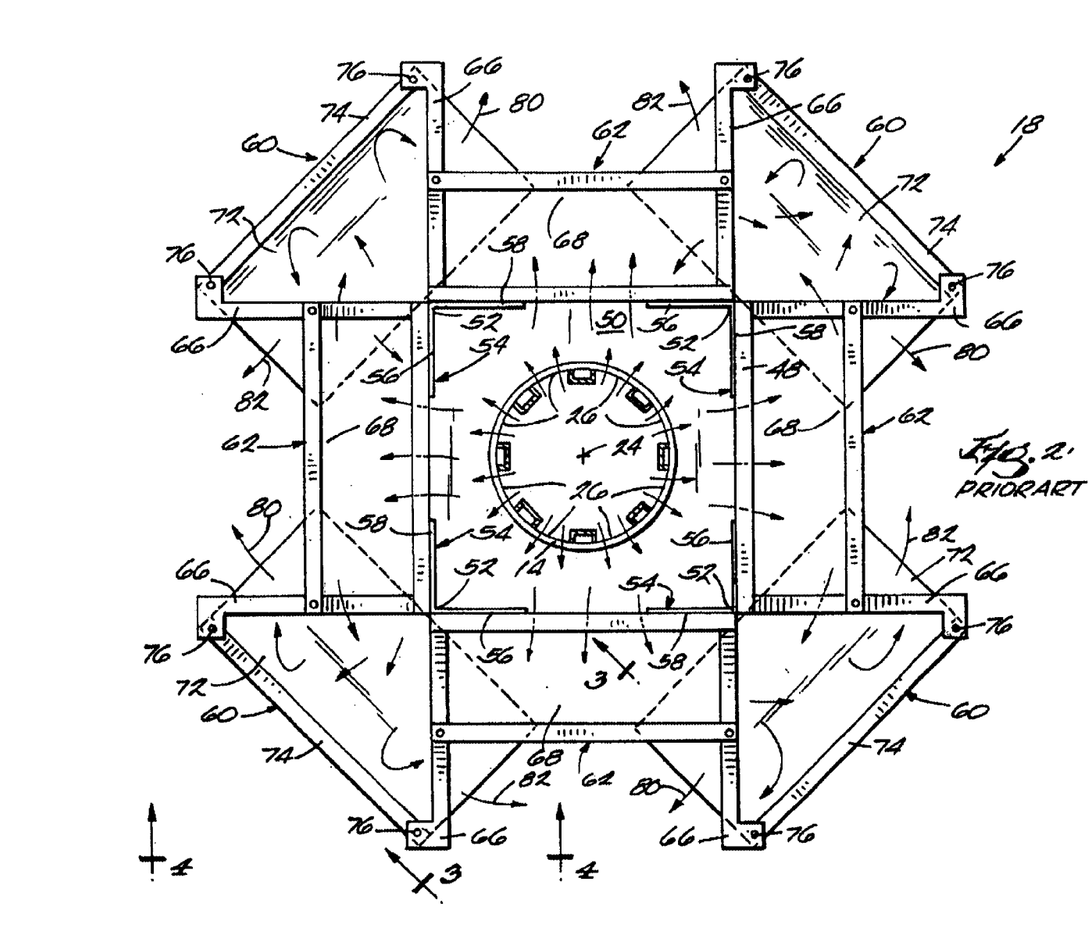
FIG. 2 is a top view illustrating a FEDWA of the clarifier arrangement shown in FIG. 1.

FIG. 1 illustrates a conventional circular clarifier 10 that is used to remove suspended solids from a solution. The clarifier 10 includes a tank 12, an influent pier 14, an access bridge 16, an outer well 17, and a FEDWA 18. The tank 12 is cylindrically shaped and is capable of containing the solution having suspended solids. The tank 12 includes a bottom 20 and a wall 22 that extends upwardly from the bottom 20. The influent pier 14 projects from the bottom 20 of the tank 12 along a central axis 24 and includes inlet ports 26 (FIG. 2). The bridge 16 is connected to a wall 22 of the tank 12 and to the influent pier 14 such that the access bridge 16 extends radially from the center of the tank 12 to the wall 22 of the tank 12. The FEDWA 18 is positioned around the inlet ports 26 of the influent pier 14 such that a substantial portion of the FEDWA 18 is positioned below the surface 28 of the solution within the tank 12. The FEDWA 18 is intended to reduce the flow energy of the solution that is discharged from the inlet ports 26 to allow the solution to slowly move radially outwardly toward the wall of the outer well 17 which prevents the flow from moving directly toward the tank wall 22.

A sludge collector 30 retrieves the sludge that settles from the solution onto the bottom 20 of the tank 12. The sludge collector 30 includes a sludge withdrawal line 32 and scraper assemblies 34. The sludge withdrawal line 32 is in fluid communication with the tank 12 though the bottom 20 of the tank 12 and near the influent pier 14. The sludge withdrawal line 32 is used to remove the sludge from the tank 12 that is directed toward the influent pier 14 by the scraper assemblies 34.

The scraper assemblies 34 include scraper arms 36 and scraper blades 38. The scraper arms 36 extend from the axis 24 toward the wall 22 of the tank 12. The scraper blades 38 are connected to the bottom of the scraper arms 36 and extend downwardly toward the bottom 20 of the tank 12 such that the scraper blades 38 contact the bottom 20 of the tank 12.

A cage 40 surrounds the influent pier 14 and is rotatably supported on the influent pier 14 by a bearing 43. The FEDWA 18, the outer well 17, and the scraper assemblies 34 are coupled to the cage 40 for rotation with the cage 40 about the influent pier 14. The scraper assemblies 34 are connected to the cage 40 by trusses 42. The cage 40 is rotated about the central axis 24 by a motorized drive unit 44 that is mounted to the influent pier 14. The cage 40 rotates the scraper assemblies 34 such that the scraper blades 38 move the sludge along the bottom 20 of the tank 12 toward the sludge withdrawal line 32.

The clarifier 10 and the sludge collector 30 are continually operated to remove solids from the solution. During operation, the solution containing suspended solids is transferred from an influent line 45 up through the influent pier 14 and into the tank 12 through the inlet ports 26. The solution flows through the FEDWA 18 and slowly to the wall of the outer well 17 to prevent the flow from moving directly to the outer wall 22 of the tank 12. As the solution flows, the solids separate and settle out of the solution onto the bottom 20 of the tank 12. The solids accumulate on the bottom 20 of the tank 12 and form a sludge that is removed by the sludge collector 30. Clarified liquid is removed from the tank 12 by an overflow weir 47 to the effluent trough 49 and out the outlet 46 located near the wall 22 of the tank 12.

Figure 3:
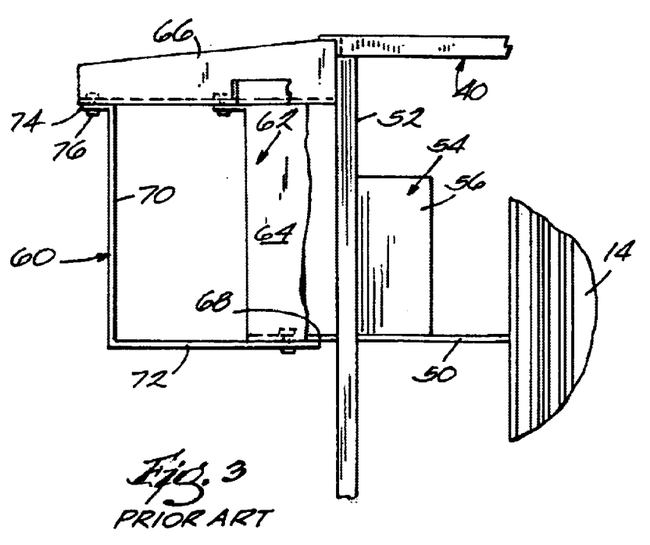
FIG. 3 is a cross sectional view taken along line 3—3 in FIG. 2, illustrating a horizontal portion of an outer baffle.
Figure 4:
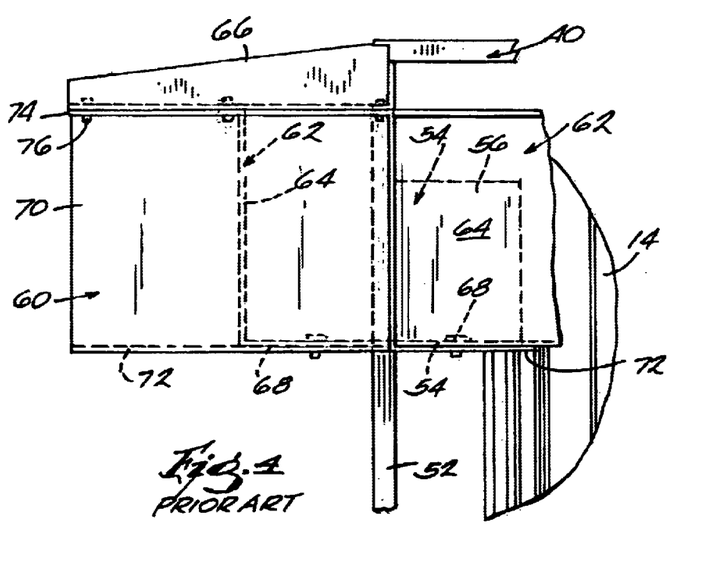
FIG. 4 is a cross sectional view taken along line 4—4 in FIG. 2.

FIG. 2 illustrates the FEDWA 18 of the clarifier shown in FIG. 1 in more detail. The FEDWA 18 is supported by the cage 40 that is coupled to the motorized drive unit 44 which is mounted to the top of the influent pier 14. The cage 40 includes a cage plate 50 that defines a planar horizontal surface that is positioned below the inlet ports 26. The cage 40 also includes cage baffles 54 that are mounted to the inside of corners 52 on the cage 40 and sealingly coupled to the cage plate 50 (FIG. 3). The cage baffles 54 include first and second portions 56, 58 that extend in first and second directions, respectively, from the corners 52 of the cage 40 such that the solution that is discharged from the inlet ports 26 is directed to flow between portions 56, 58 of the cage baffles 54 in a radial direction relative to the axis 24.

The FEDWA 18 also includes outer baffles 60 and intermediate baffles 62 positioned between the cage baffles 54 and the outer baffles 60. The intermediate baffles 62 substantially surround outside of the cage 40 such that each intermediate baffle 62 is located on a respective side of the cage 40. The intermediate baffles 62 are spaced a distance from the sides of the cage 40 and extend between two adjacent corners 52 of the cage 40. The intermediate baffles 62 include vertical portions 64 that are connected to supports 66 of the cage 40 and horizontal portions 68 that are coplanar with the cage plate 50 and sealingly coupled to the cage plate 50 (FIG. 3). The vertical portions 64 assist the cage baffles 54 in dissipating the flow energy of the solution by redirecting the flow that is discharged from between the cage baffles 54 to flow between adjacent ends of the intermediate baffles 62 in a radial direction relative to the axis 24.

With further reference to FIGS. 2 and 3, the outer baffles 60 are offset about 45 degrees with respect to the intermediate baffles 62. The outer baffles 60 include vertical portions 70 and horizontal portions 72 that are substantially planar with the cage plate 50. The vertical portions 70 include top flanges 74 that directly couple to the supports 66 with fasteners 76, and the horizontal portions 72 are coupled to the horizontal portions 68 of the intermediate baffles 62.

The FEDWA 18 dissipates the flow energy of the solution discharged from ports 26 of the influent pier 14 by separating the flow into a bi-directional flow having a first flow portion 80 and a second flow portion 82. The first flow portion 80 is directed in a first direction that is generally tangential with respect to the axis 24 of the influent pier 14 and the second flow portion 82 is directed in a second direction that is opposite to the first direction of the first flow portion 80. The flow portions 80, 82 exit the FEDWA and flow to the outer well which further dissipates the flow energy and prevents the flow from moving directly from the FEDWA to the wall of the tank.

Figure 5:
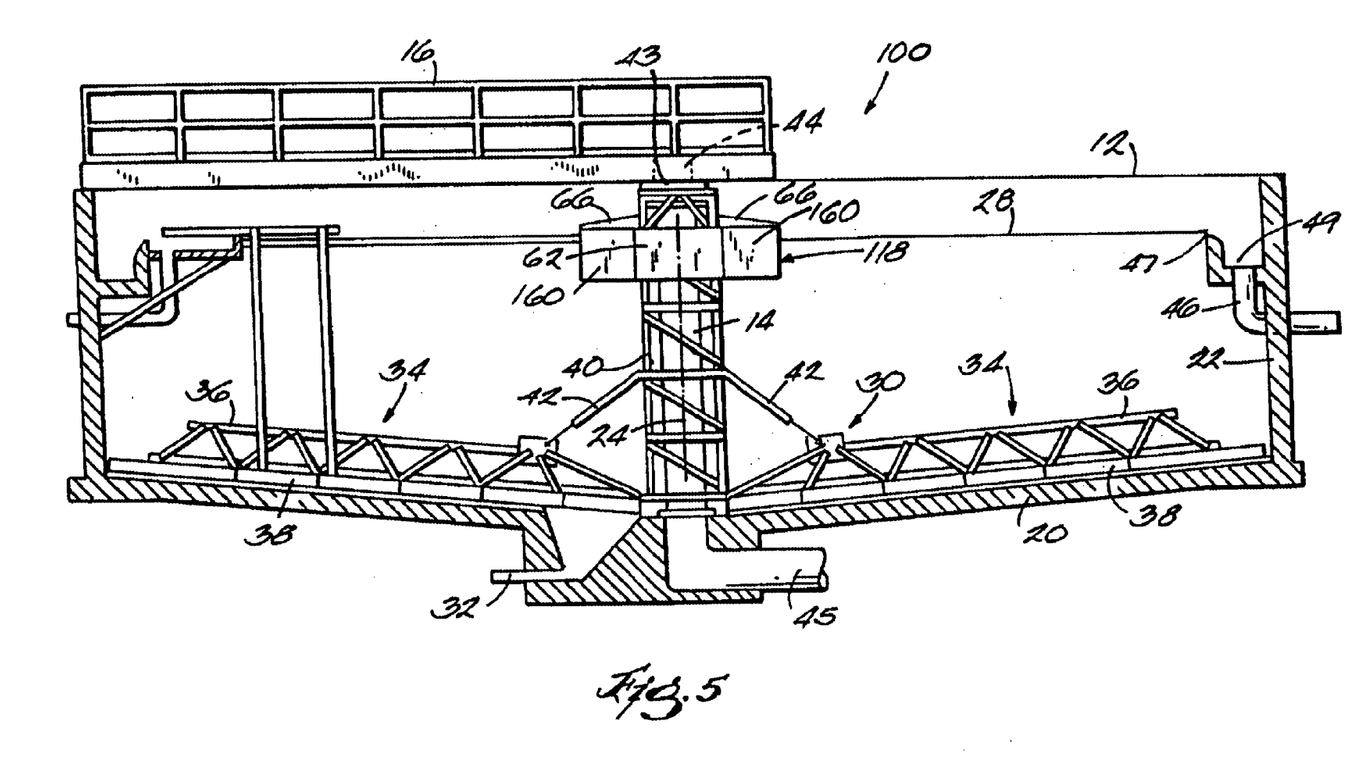
FIG. 5 is a cross section elevation view of a clarifier embodying the present invention.

The arrangement described in FIGS. 1–4 is well known and part of the prior art. The improvement to the prior art arrangement is illustrated in FIGS. 5–9 and described in detail below. FIG. 5 illustrates a circular clarifier 100 embodying the present invention. The circular clarifier 100 is similar to the circular clarifier 10 described above, and therefore, the reference numerals used to describe the circular clarifier 10 will also be used to identify common elements of the circular clarifier 100.

The clarifier 100 includes a tank 12, an influent pier 14, an access bridge 16, and a FEDWA 118. The FEDWA 118 is positioned around the inlet ports 26 of the influent pier 14 such that a substantial portion of the FEDWA 118 is positioned below the surface 28 of the solution within the tank 12. The FEDWA 118 reduces the flow energy of the solution that is discharged from the inlet ports 26 to allow the solution to slowly move radially outwardly toward the tank wall 22.

A cage 40 surrounds the influent pier 14 and is rotatably supported by the influent pier 14 by a bearing 43. The FEDWA 118 and the scraper assemblies 34 are coupled to the cage 40 for rotation with the cage 40.

The clarifier 100 and the sludge collector 30 are continually operated to remove solids from the solution. During operation, the solution containing suspended solids is transferred from an influent line 45 up through the influent pier 14 and into the tank 12 through the inlet ports 26. The solution flows through the FEDWA 118 and slowly to the outer wall 22 of the tank 12, during which the solids separate and settle out of the solution onto the bottom 20 of the tank 12. The solids accumulate on the bottom 20 of the tank 12 and form a sludge that is removed by the sludge collector 30. Clarified liquid is removed from the tank 12 by an overflow weir 47 to the effluent trough 49 and out the outlet 46 located near the wall 22 of the tank 12.

The FEDWA 118 by itself provides sufficient flow energy dissipation of the influent flow and sufficient flocculation of the solution that an outer well (reference numeral 17 in FIG. 1) is not necessary. Elimination of the outer well removes the weight of the heavy outer well from the bearing 43, thereby extending the service life of the bearing 43. This provides cost savings by eliminating the cost of fabrication and assembly of the outer well and by reducing the maintenance costs.

Figure 6:
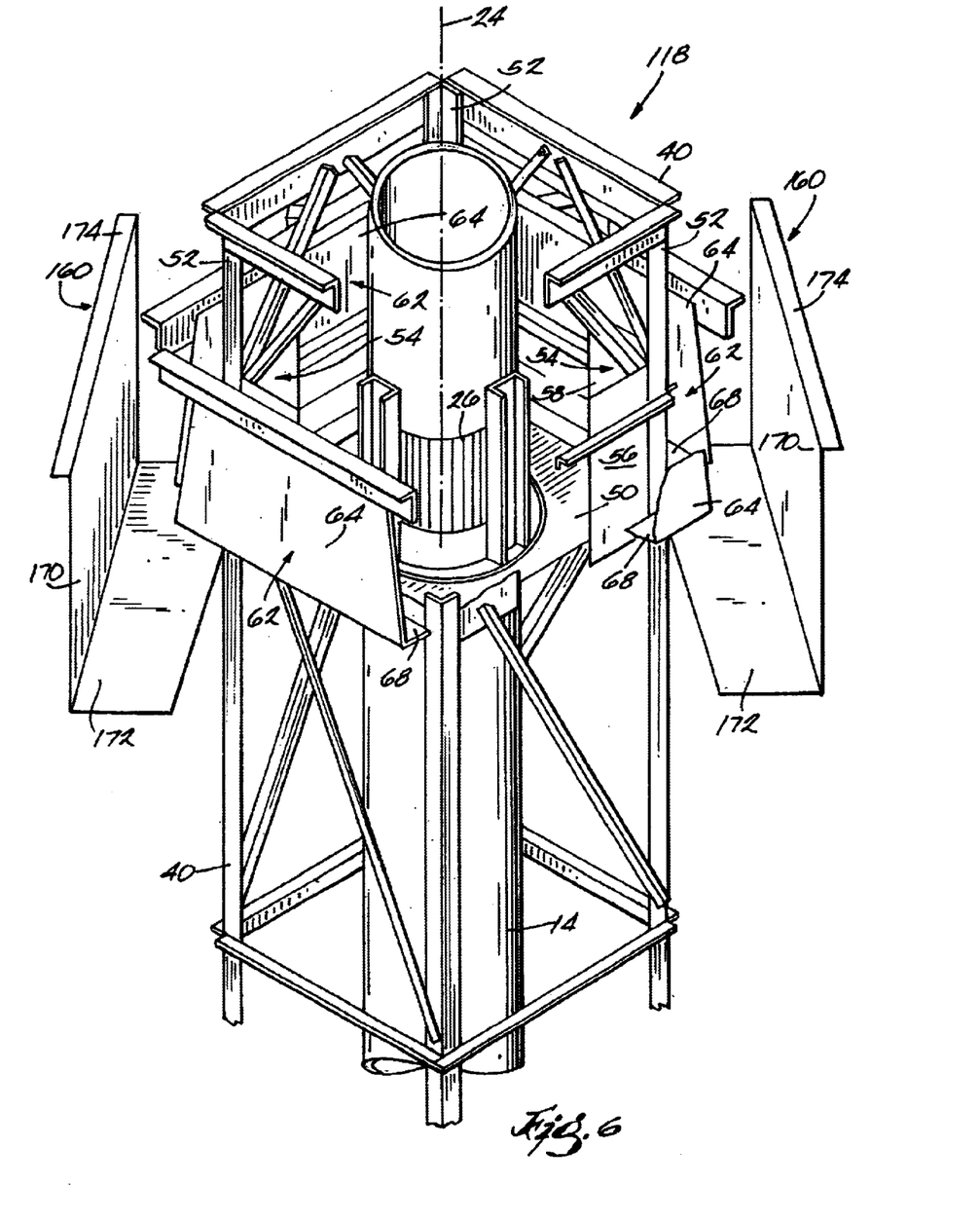
FIG. 6 is a partial perspective view illustrating a FEDWA of the clarifier shown in FIG. 5.
Figure 8:
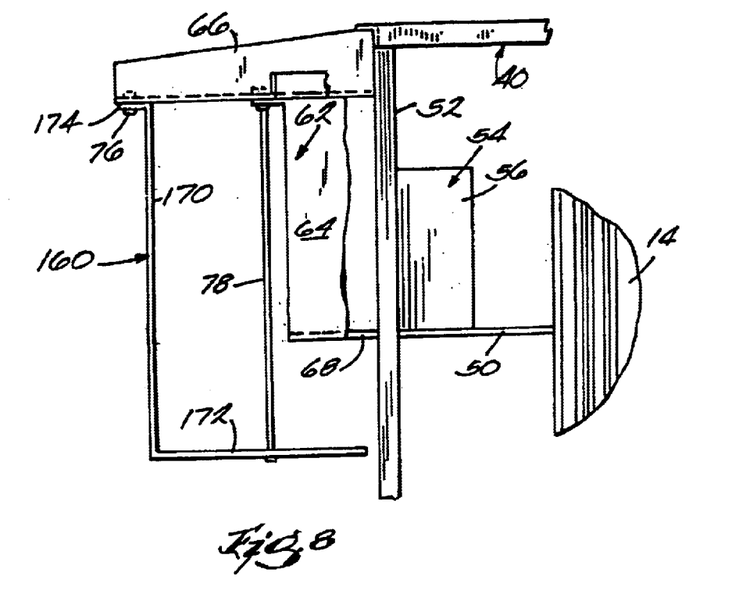
FIG. 8 is a cross sectional view taken along line 8—8 in FIG. 7, illustrating a horizontal portion of an outer baffle.

FIG. 6 illustrates FEDWA 118 of the clarifier 100 in more detail. The FEDWA 118 is supported by the cage 40 that is coupled to the motorized drive unit 44 which is mounted to the top of the influent pier 14. The cage 40 includes a cage plate 50 that defines a planar horizontal surface that is positioned below the inlet ports 26. The cage 40 also includes cage baffles 54 that are mounted to the inside of corners 52 on the cage 40 and sealingly coupled to the cage plate 50 (FIG. 8). The cage baffles 54 include first and second portions 56, 58 that extend in first and second directions, respectively, from the corners 52 of the cage 40 such that the solution that is discharged from the inlet ports 26 is directed to flow between portions 56, 58 of the cage baffles 54 in a radial direction relative to the axis 24.

The FEDWA 118 also includes outer baffles 160 and intermediate baffles 62 positioned between the cage baffles 54 and the outer baffles 160. The intermediate baffles 62 substantially surround outside of the cage 40 such that each intermediate baffle 62 is located on a respective side of the cage 40. The intermediate baffles 62 are spaced a distance from the sides of the cage 40 and extend between two adjacent corners 52 of the cage 40. The intermediate baffles 62 include vertical portions 64 that are connected to supports 66 of the cage 40 and horizontal portions 68 that are coplanar with the cage plate 50 and sealingly coupled to the cage plate 50 (FIG. 8). The vertical portions 64 assist the cage baffles 54 in dissipating the flow energy of the solution by redirecting the flow that is discharged from between the cage baffles 54 to flow between adjacent ends of the intermediate baffles 62 in a radial direction relative to the axis 24.

Figure 9:
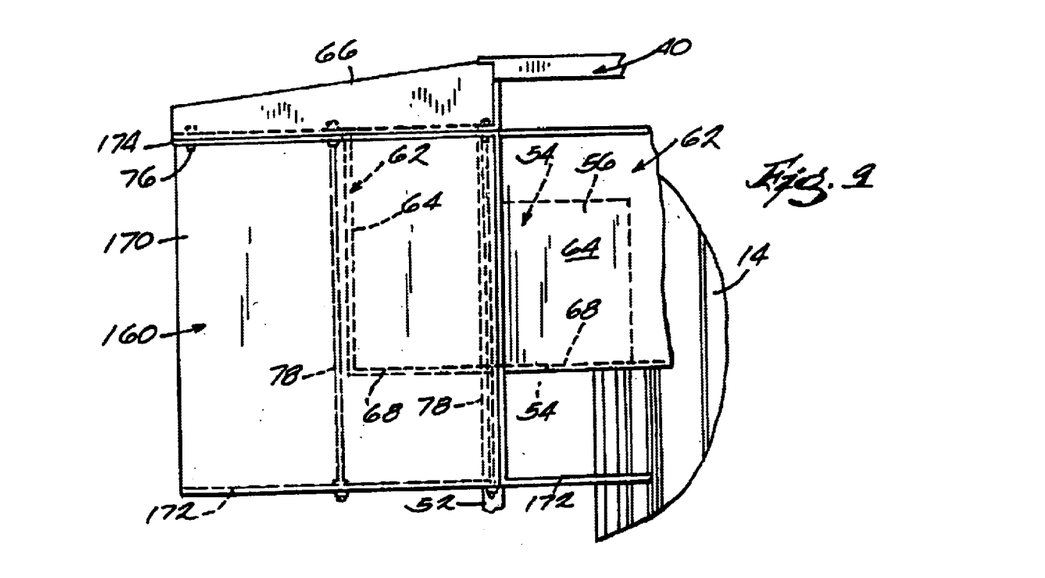
FIG. 9 is a cross sectional view taken along line 9—9 in FIG. 8.

With further reference to FIGS. 8 and 9, the outer baffles 160 are offset about 45 degrees with respect to the intermediate baffles 62. The outer baffles 160 include vertical portions 170 and horizontal portions 172 that are substantially planar with the cage plate 50. The vertical portions 170 include top flanges 174 that directly couple to the supports 66 with fasteners 76, and the horizontal portions 172 are coupled to the supports 66 by downwardly-extending support rods 78. By way of this arrangement, the outer baffles 160 create tri-axial flow by redirecting the flow that is discharged from adjacent ends of the intermediate baffles 62.

Figure 7:
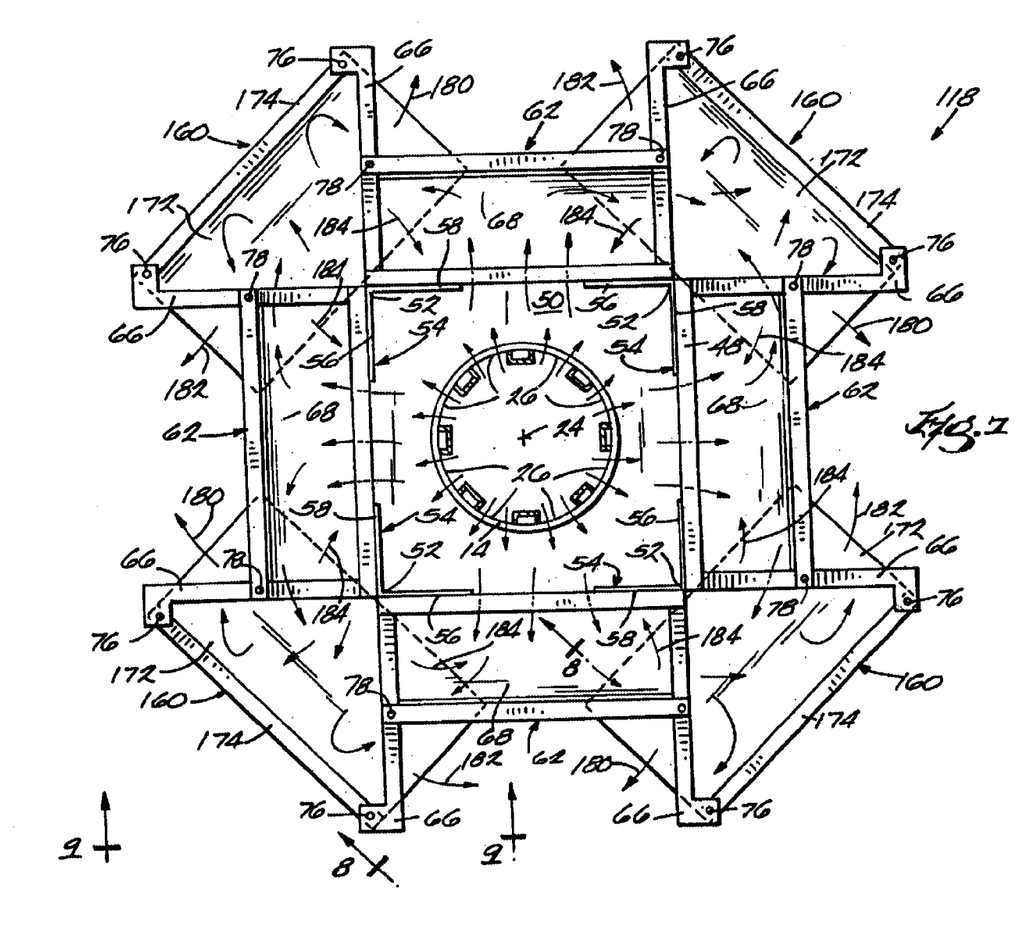
FIG. 7 is a top view illustrating the FEDWA shown in FIG. 6.

The tri-axial flow includes first, second, and third flow portions 180, 182, 184. Specifically, as shown in FIG. 7, the vertical portions 170 of the outer baffles 160 direct the first and second flow portions 180, 182 in opposite tangential directions relative to the central axis 24 and the horizontal portions 172 of the outer baffles 160 direct the third flow portions 184 toward the influent pier 14. The third flow portions 184 mix together under the cage plate 50 to result in superior diffusion and dissipation of flow energy. The tri-directional flow also reduces the amount of solids that separate and accumulate on the horizontal portions 172 of the outer baffles 160 by directing flow across substantially the entire surface of each horizontal portion 172 and minimizing "dead areas" that are common with other devices.

We claim:

1. A clarifier for separating solids from a solution, the clarifier comprising:

a tank that includes a bottom and a wall extending upwardly from the bottom;

an influent pier projecting upwardly from the bottom of the tank along an axis, the influent pier including ports that direct flow of the solution outwardly from the influent pier; and a flocculating energy dissipating well arrangement. (FEDWA) separating the flow of the solution discharged by the ports and flowing into the tank, the FEDWA separating the flow of the solution into a first flow portion that is directed in a first direction that is generally tangential with respect to the axis of the influent pier, a second flow portion that is directed in a second direction that is opposite to the first direction of the first flow portion, and a third flow portion that is directed in a third direction toward the axis.

2. The clarifier of claim 1, wherein the third flow portion achieves opposing flow resulting in impingement of the third flow portion.

3. The clarifier of claim 1, wherein the FEDWA includes a cage supported by the influent pier adjacent to the inlet ports, the cage including a plate that defines a horizontal plate that is positioned below the inlet ports and that initially directs the flow of solution outwardly from the influent pier toward the wall of the tank.

4. The clarifier of claim 3, wherein the FEDWA includes outer baffles mounted to the cage and positioned outside of the cage, and wherein the outer baffles include vertical portions and horizontal portions extending from the vertical portions, the horizontal portions being positioned lower than the plate of the cage.

5. The clarifier of claim 4, wherein the first flow portion is directed by the vertical portion of the outer baffle in the first direction, the second flow portion is directed by the vertical portion of the outer baffle in the second direction, and the third flow portion is directed by the horizontal portion of the outer baffle in the third direction.

6. The clarifier of claim 4, wherein the cage includes corners and corner baffles that are mounted to the corners of the cage.

7. The clarifier of claim 6, wherein the FEDWA includes intermediate baffles mounted to the outside of the cage and positioned between the cage and the outer baffles, the intermediate baffles also being positioned between adjacent corners of the cage.

8. The clarifier of claim 7, wherein the intermediate baffles include vertical portions and horizontal portions extending from the vertical portions, the horizontal portions being coplanar with the plate of the cage.

9. A flocculating energy dissipating well arrangement (FEDWA) for use with a clarifier, the FEDWA comprising:

a cage including a plate; and outer baffles mounted to the cage and positioned outside of the cage, wherein the outer baffles include vertical portions and horizontal portions that extend from the vertical portions, the horizontal portions being positioned lower than the plate of the cage.

10. The FEDWA of claim 9, wherein the cage is rectangular and includes corners.

11. The FEDWA of claim 10, wherein the cage includes corner baffles mounted to the corners of the cage.

12. The FEDWA of claim 11, further comprising intermediate baffles mounted to the cage and positioned between the cage and the outer baffles, the intermediate baffles also being positioned between adjacent corners of the cage.

13. The FEDWA of claim 12, wherein the intermediate baffles include vertical portions and horizontal portions extending from the vertical portions, the horizontal portions being coplanar with the plate of the cage.

14. A clarifier for separating solids from a solution, the clarifier comprising:

a tank that includes a bottom and a wall extending upwardly from the bottom;

an influent pier projecting upwardly from the bottom of the tank along an axis, the influent pier including ports that direct flow of the solution outwardly from the influent pier; and a flocculating energy dissipating well arrangement (FEDWA) separating the flow of the solution discharged by the ports and flowing into the tank, wherein the clarifier does not include any well between the FEDWA and the wall of the tank, wherein the FEDWA separates the flow of the solution into a first flow portion that is directed in a first direction that is generally tangential with respect to the axis of the influent pier, a second flow portion that is directed in a second direction that is opposite to the first direction of the first flow portion, and a third flow potion that is directed in a third direction toward the axis.

15. The clarifier of claim 14, wherein the third flow potion achieves opposing flow resulting in impingement of the third flow portion.

16. The clarifier of claim 14, wherein the FEDWA includes a cage supported by the influent pier adjacent to the inlet ports, the cage including a plate that defines a horizontal plate that is positioned below the inlet ports and that initially directs the flow of solution outwardly from the influent pier toward the wall of the tank.

17. The clarifier of claim 16, wherein the FEDWA includes outer baffles mounted to the cage and positioned outside of the cage, and wherein the outer baffles include vertical portions and horizontal portions extending from the vertical portions, the horizontal portions being positioned lower than the plate of the cage.

18. The clarifier of claim 17, wherein the first flow portion is directed by the vertical portion of the outer baffle in the first direction, the second flow portion is directed by the vertical portion of the outer baffle in the second direction, and the third flow portion is directed by the horizontal portion of the outer baffle in the third direction.

19. The clarifier of claim 17, wherein the cage includes corners and corner baffles that are mounted to the corners of the cage.

20. The clarifier of claim 19, wherein the FEDWA includes intermediate baffles mounted to the outside of the cage and positioned between the cage and the outer baffles, the intermediate baffles also being positioned between adjacent corners of the cage.

21. The clarifier of claim 20, wherein the intermediate baffles include vertical portions and horizontal portions extending from the vertical portions, the horizontal portions being coplanar with the plate of the cage.

* * * * *